United States Patent [19]

Chess et al.

[11] Patent Number: 4,992,317
[45] Date of Patent: Feb. 12, 1991

[54] REINFORCED THREE DIMENSIONAL COMPOSITE PARTS OF COMPLEX SHAPE AND METHOD OF MAKING

[75] Inventors: Henry Chess, Bloomington; Todd Drummond, Maple Grove, both of Minn.

[73] Assignee: Xerkon, Inc., Minneapolis, Minn.

[21] Appl. No.: 288,352

[22] Filed: Dec. 22, 1988

[51] Int. Cl.⁵ .............................................. B32B 3/06
[52] U.S. Cl. ..................................... 428/102; 156/93
[58] Field of Search ......................... 428/102; 156/93

[56] References Cited

U.S. PATENT DOCUMENTS 4,331,495  5/1982  Lackman et al. .................. 428/102

FOREIGN PATENT DOCUMENTS 8002254  10/1980  World Int. Prop. O. .......... 428/102

Primary Examiner—Alexander S. Thomas

[57] ABSTRACT

A dry fiber form, for use in the preparation of composite parts, is provided with reinforcing threads sewn across the juncture of two non-parallel portions, to prevent failure in the interior of the part due to "out-of-plane" stress developed under applied load, the stress being in a direction other than that of the fibers at said juncture.

1 Claim, 1 Drawing Sheet

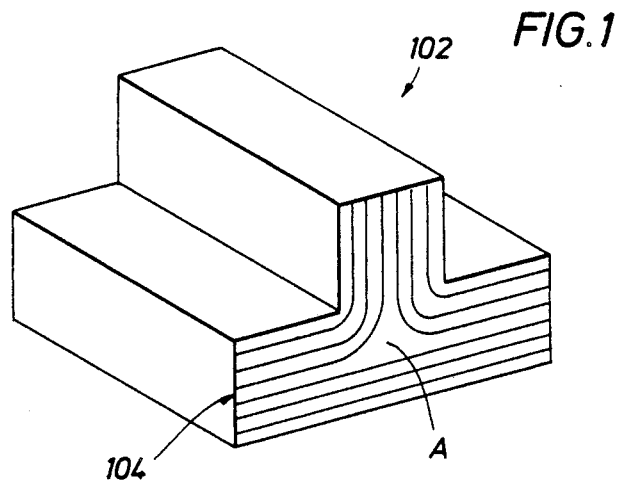
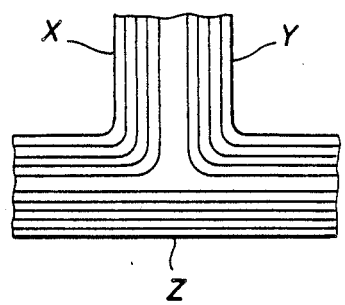
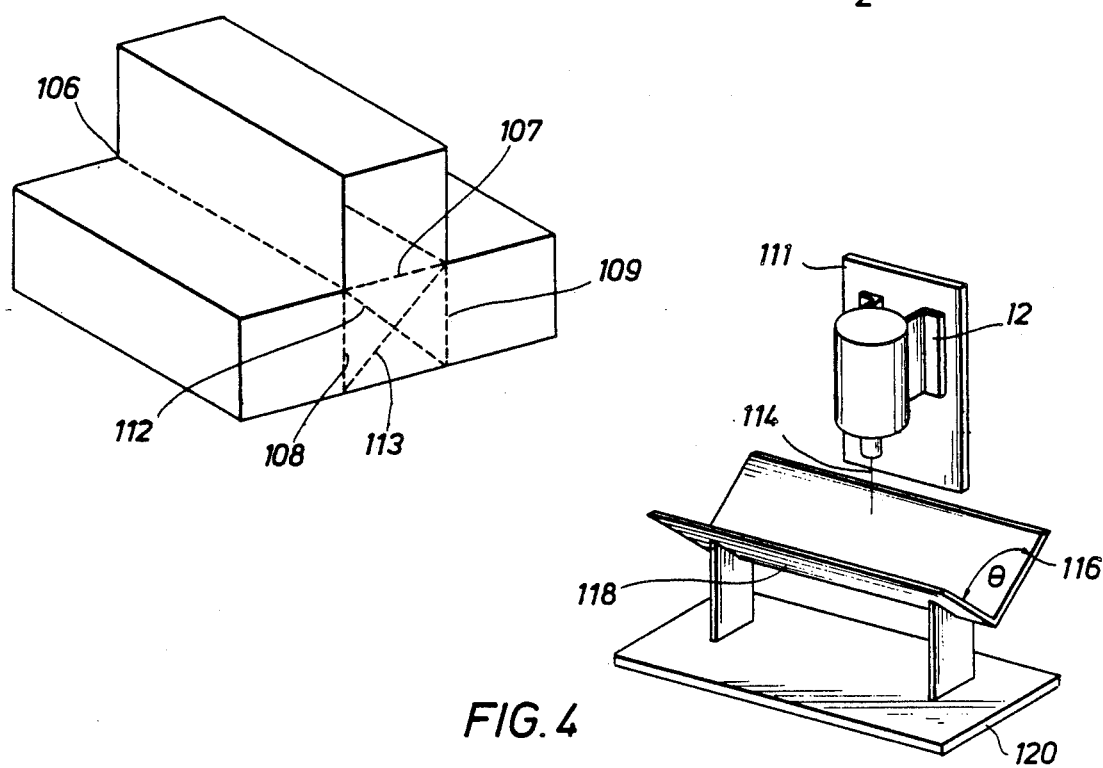

REINFORCED THREE DIMENSIONAL COMPOSITE PARTS OF COMPLEX SHAPE AND METHOD OF MAKING

BACKGROUND OF THE INVENTION

1. Field of the Invention

This invention pertains to composite parts prepared from oriented yarns of high modulus embedded in a resin matrix, which is subsequently cured, to give a lightweight composite part of high strength.

2. Background of the Prior Art

The aerospace industry is making increasing use of composite materials, used herein to denote materials prepared from oriented yarns of high modulus embedded in a cured resin matrix, as high strength, lightweight parts useful wherever energy conservation, and high performance standards are required. As a result, more and more parts, and varied types of parts, prepared from these materials are being integrated in the overall structures of aircraft, spacecraft and the like. Naturally, increasing numbers of these structures have complex, or non-planar, shapes.

A number of methods are known for the preparation of these composite parts. One method involves the use of "prepregs", or unidirectional tapes impregnated with a curable resin, which are then "laid-up", or formed around or in a mold, and subsequently trimmed and cured, to the desired shape and characteristics.

An entirely different method, embodied in U.S. Pat. Nos. 4,664,961 and 4,681,049, involves the preparation of dry "fiber forms", or a three dimensional array of layers or bundles of oriented, high modulus yarns, the orientation being prepared according to a predetermined schedule, which approximate the shape of the final product desired. This fiber form is infused or saturated with a curable resin, and then subjected to curing conditions, and trimmed to final dimensions, to provide the desired composite article., A similar approach is disclosed in U.S. Pat. No. 4,410,577, using woven layers having different yarn orientation.

When prepared according to the latter process described above, that is, through the use of a dry fiber form, the fiber form is frequently prepared by marrying sub-assemblies, to approximate the final shape. Thus, a "T" shape, as illustrated in FIG. 1, can be visualized as the marriage of three sub-assemblies, pictured in FIG. 2, including two "L" shapes X and Y, and straight flange Z. This is applicable not only to the T-shaped part illustrated herein, but virtually any composite fiber form characterized by at least two portions which lie in distinct, non-parallel planes, the two portions being integral and joined at a common juncture.

In the above-described method, and indeed, other methods known for the assembly of dry fiberforms, this inevitably results in a central area A at the plane juncture is interface of two distinct planes, applied load in any of several directions, "in plane" or out, can result in stresses which are "out-of-plane", or at an angle to the fiber direction. One such direction may be at a direction normal to the tangent described by the fibers at the junction interface. Due to lack of reinforcement running in this direction at the interface, cracking may occur. The resulting failure mode is a complicated dynamic involving both shear and cracking.

Accordingly, the provision of composite structural parts of complex shape, prepared using dry fiber forms which are subsequently infused with a resin and cured, which do not have a central or juncture section, characterized by a lack of reinforcement in "out-of-plane" directions of stress remains an unsatisfied need of the prior art.

SUMMARY OF THE INVENTION

It is one object of this invention to meet the above-identified needs of the prior art. It is yet another object of this invention to provide a means for reinforcing the central junction area of dry fiber-forms, and the resulting cured product, of complex shape, by a method which may be easily accommodated in an automated manufacturing process.

To reinforce the central junction area, and avoid the proliferation of cracking, delamination, and appearance of major flaws therein, under load, a reinforcing thread is passed through the juncture, for instance by sewing, along an angle which intersects the angles formed by the intersection of two portions of the fiberform which meet at the above-described juncture. This thread is sewn along the entire length of the junction, in as many courses as necessary to provide the desired reinforcement. The angle of intersection is preferably in the principal direction of stress under applied load. Further reinforcement may be provided by sewing a second reinforcing stitch at right angles to the first one, i.e., at the opposite side of the juncture. Further reinforcement may be provided by sewing along the outline of the juncture, thereby stabilizing the central area of the fiberform. This can be achieved, if sewing is used, on a modified sewing machine, which is provided with support means capable of supporting the assembled fiber form at an angle with respect to the sewing needle.

BRIEF DESCRIPTION OF THE DRAWINGS

FIG. 1 is a cut-away perspective view of a complex fiber form with a central "transition" area along the junction of two portions of the fiberform.

FIG. 2 is a schematic view of the sub-assemblies of a fiber form.

FIG. 3 is a cut-away view similar to FIG. 1, illustrating the reinforcing stitching of the claimed invention.

FIG. 4 is a schematic frontal view of a sewing means useful for practicing the claimed invention.

DETAILED DESCRIPTION OF THE INVENTION

As noted above, dry fiber forms of complex shape (i.e., fiber forms prepared of oriented high modulus fibers, such as carbon, graphite, Kevlar TM, boron, fiberglass and the like) characterized in that they have at least two integral parts which lie in non-parallel planes and intersect along a junction, can be thought of as prepared from sub-assemblies, which will leave a transitional area A in the center of the junction, as illustrated in FIG. 1 (and FIG. 2) where there is no fiber in the principal stress direction. Upon resin infusion, and curing, this is reflected in the final part as a resin rich area, which may fail earlier than the surrounding material. To reinforce the central junction area, as illustrated in FIG. 3, thread 112 is sewn through the junction, including much of area A, (FIG. 1) along an intersecting angle, perhaps bisecting the intersection of integral parts 102 and 104. A complementary reinforcement stitch, 113, is sewn through the same juncture at right angles to a first reinforcing thread 112. Both threads 112 and 113 are sewn along the entire junction line 106, from both sides of the juncture. To provide added stability to the part, and prevent the proliferation of cracking and the like, the juncture may be further stabilized by reinforcement sewing 107-109, which "outlines" the juncture area. Of course, as illustrated, only the sewing along a transverse cross section has been illustrated. However, as noted above, these sewn lines extend throughout the length of the juncture, which corresponds to central area A of FIG. 1.

The sewn thread may provide considerable reinforcement, and the prevention of catastrophic failure, as long as the requirements of modulus and resin compatability are met. Thus, the sewn thread may be prepared from any of several types of fiber. Where particularly high strength applications, and demanding tolerances are required, the reinforcement thread, in whole in part, may be comprised of fiberglass, Kevlar TM, or particularly, carbon and graphite.

As the fiber form to be reinforced is free of resin, the reinforcing thread may be sewn in, using a modified sewing machine with little damage to the fibers. As illustrated in FIG. 4, one apparatus that may be used in the practice of this invention includes a generalized sewing machine 111, including a sewing head 12, and needle 114. The needle passes between two support plates 116 and 118, which support the two integral pieces of the fiber form meeting at a juncture. Supports 116 and 118 may be moved with respect to each other, both to alter the gap therebetween, and the angle e formed thereby. This angle corresponds, of course, to the angle formed by the intersection of the two integral parts defining the juncture. Ideally, supports 116 and 118 are mounted on a platform 120, equipped for reciprocation, to provide repetitive sewing along juncture line 106. With the fiber form clamped to supports 116 and 118, set at the proper distance and angle, the entire operation may be automated, requiring the intervention of an operator only to shift the part, to provide complementary reinforcing sew line 113. Stitch depth, and frequency, may be preset, as in conventional sewing machines. Machines of the type described above have been prepared by SPULL ANDERSON MACHINE CO., of Chaska, Minnesota and may be obtained therefrom, or by modification of preexisting or alternative apparatus.

Once the reinforcing threads have been sewn through the juncture, the fiber form is ready for resin infusion. This may be accomplished through any of a variety of processes, including those disclosed in copending U.S. patent application 06/944,446 and U.S. Pat. No. 4,622,091. Other methods of infusing the resin are well known to those of skill in the art, and may be employed in the practice of the invention described herein.

The resin-impregnated fiberform, is then preliminarily cured, such that it may be transported, to a point of final bonding to a preexisting surface, or fully cured, to give a finished article. Again, curing may be through any conventional process, including vacuum bagging and autoclaving, or, in a more preferred embodiment, according to the process disclosed in U.S. patent application 06/944,446.

The invention addressed herein has been described with reference to particular forms, figures and aspects. In particular, the invention has been described with respect to an idealized "T" shape. Other shapes, involving the juncture of two integral parts of the fiber form which lie in non-parallel planes, such as "I" beams, "L" rods, "X" shapes, and more complex and varied shapes, are equally susceptible to practice according to the above-described invention, and are embraced by the claims attached hereto, unless indicated otherwise.

In particular, this invention is applicable to virtually any three-dimensional structure which develops or experiences "out-of-plane" stress in response to an applied load. Similarly, the resin, yarn and thread used in the performance of the invention is not intended to be limited by the description set forth above, and any known materials may be used, to the extent described.

What is claimed as new and desired to be secured by Letters Patent of the United States is:

1. A dry resin free dimensionally unstable fiber form, comprised of at least two non-resin impregnated integral parts which lie, at least partially, in intersecting non-parallel planes, the intersection defining a non-adhesively bonded juncture which is reinforced by at least one thread simultaneously defining a hole through said juncture and sewn through said juncture, along a line intersecting the angle formed by said juncture, said dry resin-free fiber form prepared for subsequent resin saturation and cure.

* * * * *